United States Patent
Nakamura et al.

(10) Patent No.: US 8,128,896 B2
(45) Date of Patent: Mar. 6, 2012

(54) PERMSELECTIVE MEMBRANE TYPE REACTOR

(75) Inventors: Toshiyuki Nakamura, Nagoya (JP); Nobuhiko Mori, Nagoya (JP); Osamu Sakai, Nagoya (JP); Koichi Katsurayama, Nagoya (JP); Takashi Ina, Nagoya (JP); Koki Hamada, Yokohama (JP)

(73) Assignee: NGK Insulators, Ltd., Nagoya (JP)

( * ) Notice: Subject to any disclaimer, the term of this patent is extended or adjusted under 35 U.S.C. 154(b) by 611 days.

(21) Appl. No.: 12/053,840

(22) Filed: Mar. 24, 2008

(65) Prior Publication Data
US 2008/0311014 A1    Dec. 18, 2008

(30) Foreign Application Priority Data
Mar. 26, 2007   (JP) ................... 2007-078366

(51) Int. Cl.
*B01J 8/02* (2006.01)
*B01J 8/04* (2006.01)

(52) U.S. Cl. ........ 422/631; 422/634; 422/636; 422/638; 422/617; 422/239

(58) Field of Classification Search ................ 422/631, 422/634, 636, 638, 239, 617
See application file for complete search history.

(56) References Cited

U.S. PATENT DOCUMENTS

| 6,461,408 | B2 * | 10/2002 | Buxbaum ................ 95/55 |
| 6,548,029 | B1 * | 4/2003 | Towler et al. ............ 422/230 |
| 6,913,736 | B2 * | 7/2005 | Alvin et al. ............. 422/211 |
| 2008/0213142 | A1 * | 9/2008 | Katsurayama et al. ...... 422/222 |

FOREIGN PATENT DOCUMENTS

| JP | 2004-284912 A1 | 10/2004 |
| WO | 2007/029780 A1 | 3/2007 |

OTHER PUBLICATIONS

Gao et al. Chemical Stability and Its Improvement of Palladium-Based Metallic Membranes. Ind. Eng. Chem. Res. 2004, vol. 43, pp. 6920-6930.*

Koichi Kikuchi et al., "*Membrane Reactor Using Microporous Glass-Supported Thin Film of Palladium. Application to the Water Gas Shift Reaction*," 1989 The Chemical Society of Japan, Chemistry Letters, pp. 489-492.

U.S. Appl. No. 12/042,554, filed Mar. 5, 2008, Katsurayama et al.

* cited by examiner

*Primary Examiner* — Jennifer A Leung
(74) *Attorney, Agent, or Firm* — Burr & Brown

(57) ABSTRACT

There is disclosed a permselective membrane reactor which efficiently forms hydrogen by use of a water-gas shift reaction and which is excellent in an aspect of manufacturing cost. In a permselective membrane reactor, a permselective membrane is a Pd membrane or a Pd alloy membrane, and a catalyst layer includes a first catalyst layer on the side of the permselective membrane and a second catalyst layer disposed apart from the permselective membrane. The first catalyst layer has a noble metal-based catalyst, and the second catalyst layer has an iron-based catalyst.

10 Claims, 3 Drawing Sheets

PERMSELECTIVE MEMBRANE TYPE REACTOR

BACKGROUND OF THE INVENTION

1. Field of the Invention

The present invention relates to a permselective membrane type reactor. More particularly, it relates to a permselective membrane type reactor which simultaneously performs suppression of a methanation reaction and proceeding of a shift reaction while suppressing deterioration of a thinned permselective membrane, whereby hydrogen can efficiently be recovered.

2. Description of the Related Art

A hydrogen gas is used as a basic material gas for petrochemistry in large quantities, and largely expected as a clean energy source. The hydrogen gas which is used for such a purpose is formed from a main material gas including a hydrocarbon such as methane, butane, or kerosene, or an oxygen-containing hydrocarbon such as methanol by the utilization of a reforming reaction, a partial oxidizing reaction, or a decomposition reaction, and the resultant byproducts of carbon monoxide and water are then subjected to a shift reaction. Hydrogen formed in this manner can be separated and obtained from the gas by use of a permselective membrane such as a palladium alloy membrane which allows hydrogen to selectively permeate therethrough.

As described above, the shift reaction is performed after the reforming reaction or the like in a hydrogen production process. From viewpoints of a thermodynamic restriction and a kinetic problem, the water-gas shift reaction is usually constituted of two steps of a high temperature water-gas shift reaction and a low temperature water-gas shift reaction. Industrially, in the high temperature water-gas shift reaction at 300 to 500° C., an iron oxide-chromium oxide type composite catalyst (hereinafter merely referred to as an iron-chromium catalyst) is usually used. A water-gas shift reaction using a noble metal-based catalyst is also investigated (for example, see Patent Document 1).

The water-gas shift reaction is represented by the following formula (a):

$$CO + H_2O \rightleftharpoons CO_2 + H_2 \qquad (a).$$

In the shift reaction in which a reforming gas is used as the material gas, the following methanation reaction could occur as a side reaction. However, when the iron chromium catalyst is used, the only water-gas shift reaction selectively proceeds.

The methanation reaction is represented by the following formula (b):

$$CO + 3H_2 \rightleftharpoons CH_4 + H_2O \qquad (b).$$

Moreover, a membrane type reactor (a permselective membrane type reactor) which simultaneously performs the above water-gas shift reaction and separation of hydrogen is also known. As a use example of the membrane type reactor, for example, a membrane type reactor is prepared using a Pd membrane having a membrane thickness of 20 μm and an iron-chromium catalyst, and a principle of an effect of the reactor with respect to the water-gas shift reaction is demonstrated (for example, see Non-Patent Document 1).

In the permselective membrane type reactor, a product is selectively removed from a reversible reaction system to provide an advantage that the reaction apparently proceeds in excess of an extent of equilibrium reaction. Such a permselective membrane type reactor has a merit that the reactor can be a compact device because the reaction and the separation of hydrogen can simultaneously be performed as described above. In addition, the hydrogen gas is extracted to shift equilibrium of the reaction toward a forming side, whereby a reaction temperature can be lowered. In consequence, effects such as lowering of an operation temperature, suppression of deterioration of a metal member and energy saving can be expected.

[Patent Document 1] JP-A-2004-284912
[Non-Patent Document 1] Eiichi Kikuchi et al., Chemistry Letters (1989) 489-492

In such a conventional permselective membrane type reactor, a Pd membrane thickness is large, so that a permeation performance of a Pd membrane is not sufficient, and it has been difficult to efficiently recover hydrogen. Reduction of the Pd membrane thickness not only improves the permeation performance but also leads to reduction of an amount of Pd to be used. Therefore, the reduction of the membrane thickness is preferable from the viewpoint of cost.

When an iron-based catalyst is used, only a water-gas shift reaction at 300 to 500° C. selectively proceeds, and a methanation hardly occurs. As described above, to improve the permeation performance of the Pd membrane, it is preferable to reduce the thickness of the Pd membrane. However, in the permselective membrane type reactor in which a thin Pd membrane and the conventional iron-based catalyst are used, in a case where the Pd membrane comes in contact with iron as a catalyst component at a high temperature, there is a problem that the permselective membrane deteriorates owing to the reaction in a remarkably short time. The thinner the Pd membrane is, the more remarkable a deterioration rate of the permselective membrane becomes. When the reaction temperature rises, the deterioration rate increases more remarkably.

On the other hand, in recent years, as a catalyst which replaces the conventional iron-based catalyst or a copper-based catalyst, a noble metal-based shift catalyst having a high resistance to oxidation and a high activity has been reported. However, when the noble metal-based catalyst is used, there is a problem that the methanation proceeds to consume a target product, hydrogen. Also, the noble metal-based catalyst is expensive and has a problem in the cost aspect. In addition, the noble metal-based catalyst has slightly poor selectivity as compared with the iron-based catalyst. Therefore, as a result, there has been a problem that the performance of the permselective membrane type reactor deteriorates.

SUMMARY OF THE INVENTION

An object of the present invention is to provide a permselective membrane type reactor which efficiently forms hydrogen by use of a water-gas shift reaction and which also is excellent in a production cost aspect.

The present inventors have found that the above object can be achieved by constituting a reactor so that the reactor has a noble metal-based catalyst on the side of a permselective membrane and an iron-based catalyst on a position away from the permselective membrane. That is, according to the present invention, the following permselective membrane type reactor is provided.

[1] A permselective membrane type reactor comprising: a permselective membrane formed of a Pd membrane or a Pd alloy membrane and having an $H_2$ selective permeation ability; and a catalyst layer which promotes a chemical reaction, the catalyst layer having a noble metal-based catalyst in a first catalyst layer on the side of the permselective membrane, and an iron-based catalyst in a second catalyst layer disposed away from the permselective membrane as compared with the first catalyst layer.

[2] The permselective membrane type reactor according to the above [1], wherein the first catalyst layer has a thickness of 0.1 to 5 cm.

[3] The permselective membrane type reactor according to the above [1], wherein the noble metal-based catalyst of the first catalyst layer is packed in a range of 1:0.5-40 in a volume ratio, with relation to a packed amount of the iron-based catalyst of the second catalyst layer.

[4] The permselective membrane type reactor according to the above [1], wherein the noble metal contained in the first catalyst layer is at least one selected from the group consisting of Ru, Rh, Pd, Ag, Ir, Pt, and Au.

[5] The permselective membrane type reactor according to the above [4], wherein the first catalyst layer is a layer carrying the noble metal, which is carried on a carrier constituted of a porous inorganic oxide including at least one selected from the group consisting of Ti, Al, Zr, Ce, Si, and Mg.

[6] The permselective membrane type reactor according to the above [1], wherein the iron-based catalyst is an iron-chromium catalyst.

[7] The permselective membrane type reactor according to the above [3], wherein the iron-based catalyst is an iron-chromium catalyst.

[8] The permselective membrane type reactor according to the above [1], wherein the Pd alloy forming the permselective membrane is a Pd—Ag alloy or a Pd—Cu alloy.

[9] The permselective membrane type reactor according to the above [1], wherein the permselective membrane has a membrane thickness of 20 μm or less.

[10] The permselective membrane type reactor according to the above [1], wherein at least one of the first and second catalyst layers contains a catalyst dispersed on a substrate formed in a pellet, foam, or honeycomb shape, or a catalyst itself formed in a pellet, foam, or honeycomb shape.

In the permselective membrane type reactor of the present invention, the noble metal-based catalyst is disposed only in the vicinity of the permselective membrane formed of the Pd membrane or the Pd alloy membrane (hereinafter referred to also as the Pd-based alloy membrane) and having the $H_2$ selective permeation ability, and the inexpensive iron-based catalyst is used in the rest of the catalyst layer (an outer periphery), whereby cost can be reduced. The noble metal-based catalyst is employed, whereby chemical deterioration of the Pd-based alloy membrane due to contact/reaction between the catalyst and the Pd-based alloy membrane can be prevented, and an operation can be performed for a long time. The noble metal-based shift catalyst has poor selectivity as compared with the iron chromium catalyst, but owing to a hydrogen extraction effect obtained by a combination with the membrane, proceeding of a methanation is suppressed. Moreover, a promotion effect of a water-gas shift reaction in excess of an equilibrium reaction ratio can be obtained.

BRIEF DESCRIPTION OF THE DRAWINGS

FIG. 1A is a plan view, and FIG. 1B is a sectional view of the reactor cut along a plane including a central axis;

EXPLANATION OF NUMERALS

1: a reactor, 2: a separation tube, 3: a permselective membrane, 4: a catalyst layer, 11: an inlet, 12: an outlet, and 100: a permselective membrane type reactor.

DESCRIPTION OF THE INVENTION

An embodiment of the present invention will hereinafter be described with reference to the drawings.

The present invention is not limited to the following embodiment, and can be altered, modified or improved within the scope of the present invention.

Figure 1A:
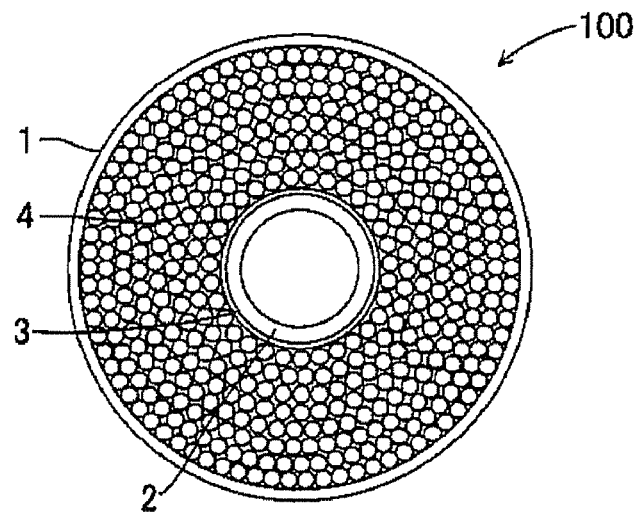
FIGS. 1A and 1B schematically show a permselective membrane type reactor of the present invention.
Figure 1B:
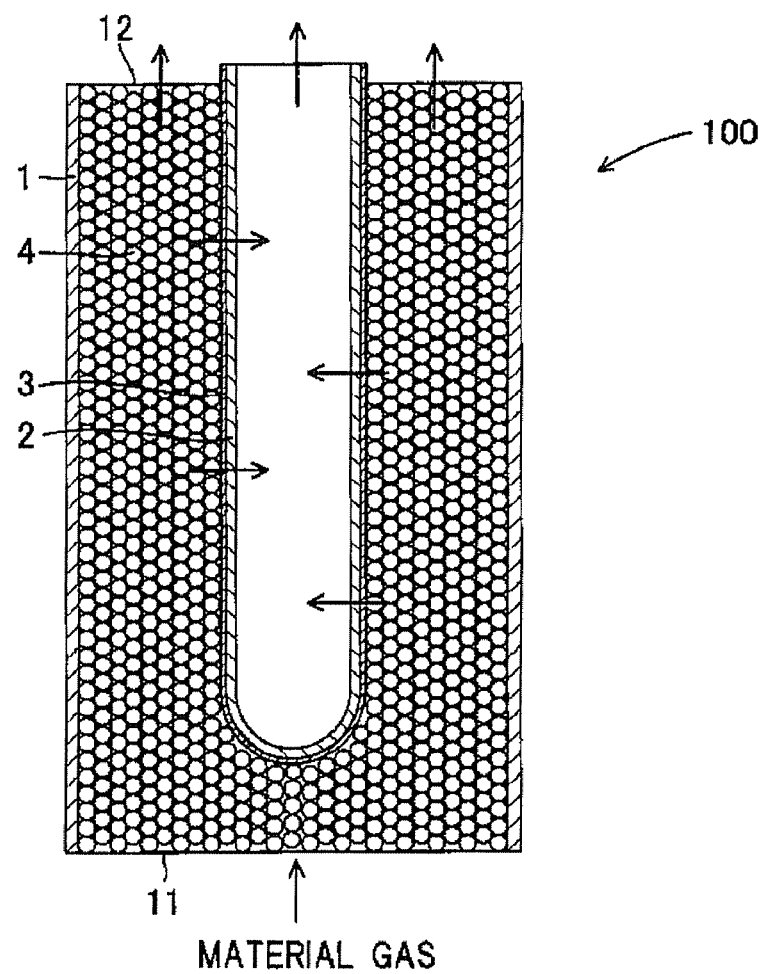

FIGS. 1A and 1B are diagrams schematically showing one embodiment of a permselective membrane type reactor of the present invention, FIG. 1A is a plan view, and FIG. 1B is a sectional view of the reactor cut along a plane including a central axis. As shown in FIGS. 1A and 1B, a permselective membrane type reactor 100 has a cylindrical reactor 1 having one end as a gas inlet 11 and the other end as a gas outlet 12, a bottomed cylindrical separation tube 2 inserted in the reactor 1, having a permselective membrane 3 on the surface thereof and including a porous base portion, and a catalyst layer 4 disposed between the reaction tube 1 and the separation tube 2.

Figure 2:
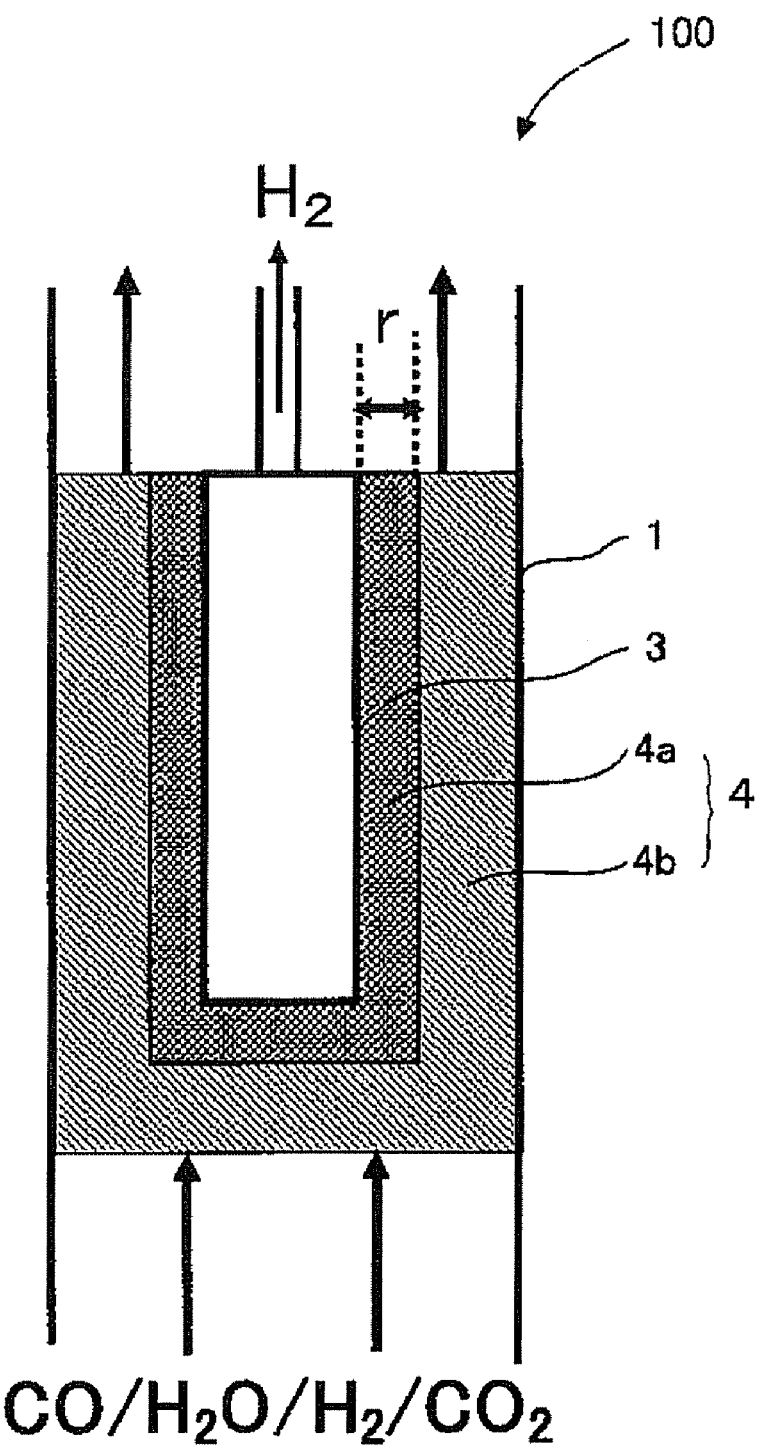
FIG. 2 is a schematic view schematically showing a catalyst layer of the permselective membrane type reactor.

The catalyst layer 4 has a pellet shape, and is formed of a catalyst packed in the form of a packed bed in a space between the reaction tube 1 and the separation tube 2. A reforming gas supplied from the inlet 11 comes in contact with this catalyst layer 4, and allows carbon monoxide in the reforming gas to react with water to form hydrogen and carbon dioxide. It is to be noted that the catalyst layer 4 may include a catalyst dispersed on a substrate formed in a pellet, foam, or honeycomb shape, or a catalyst itself formed in a pellet, foam, or honeycomb shape. The permselective membrane type reactor 100 of the present embodiment includes the permselective membrane 3 which is a Pd membrane or a Pd alloy membrane (hereinafter referred to also as the Pd-based alloy membrane). As schematically shown in FIG. 2, the catalyst layer 4 is constituted of a first catalyst layer 4a on a permselective membrane 3 side, and a second catalyst layer 4b disposed away from the permselective membrane 3. The first catalyst layer 4a has a noble metal-based catalyst, and the second catalyst layer 4b has an iron-based catalyst.

The noble metal-based catalyst can suppress deterioration of the Pd membrane or the Pd alloy membrane, and can continue a water-gas shift reaction over a long time as compared with an iron-chromium catalyst. Therefore, the noble metal-based catalyst is disposed on the permselective membrane 3 side. On the other hand, the permselective membrane type reactor 100 of the present embodiment has a constitution in which the iron-based catalyst is disposed on an outer peripheral side of the noble metal-based catalyst, and does not come in direct contact with the permselective membrane 3. With regard to the iron-based catalyst, only a water-gas shift reaction at 300 to 500° C. selectively proceeds, and a methanation hardly occurs. The iron-based catalyst has excellent selectivity as compared with the noble metal-based catalyst. When the iron-based catalyst comes in contact with the Pd-based alloy membrane of the permselective membrane 3, the Pd-based alloy membrane is deteriorated. However, in a constitution in which the iron-based catalyst does not come in direct contact with the permselective membrane 3 as in the present embodiment, the deterioration of the permselective membrane 3 owing to the iron-based catalyst can be prevented, and the permselective membrane type reactor 100 which is excellent in aspects of reaction selectivity and cost can be provided.

Moreover, hydrogen formed by the water-gas shift reaction and hydrogen contained in the reforming gas as a material gas passes through the Pd membrane or the Pd alloy membrane to flow into a permeation side (an inner side of the separation tube 2 in FIG. 1B), so that a hydrogen partial pressure in a space packed with the catalyst (a non-permeation side) lowers. Therefore, in the water-gas shift reaction represented by the above formula (a), hydrogen as a product is abstracted, so that the reaction is promoted. On the other hand, in the methanation represented by the above formula (b), hydrogen as a product is abstracted, so that the reaction is suppressed. Therefore, according to the permselective membrane type reactor of such a present embodiment, hydrogen can efficiently be recovered.

In the permselective membrane type reactor 100 of the present embodiment shown in FIGS. 1A and 1B, the membrane thickness of the permselective membrane 3 is preferably 20 µm or less, further preferably 0.05 to 10 µm, especially preferably 0.1 to 5.0 µm, and most preferably 0.5 to 3.0 µm. When the membrane thickness is larger than 20 µm, a permeation rate of hydrogen lowers. When the membrane thickness of the permselective membrane 3 decreases, hydrogen easily permeates the membrane, and hydrogen can efficiently be recovered. However, when the membrane thickness excessively decreases, durability and hydrogen selectivity of the membrane sometimes lower.

As the Pd alloy forming the permselective membrane 3, a Pd—Ag alloy or a Pd—Cu alloy is preferable from viewpoints of durability and hydrogen permeation performance. Hydrogen can efficiently and selectively permeate the membrane made of such an alloy.

In the porous separation tube 2 having the permselective membrane 3 formed on the surface thereof, a ceramic porous material such as alumina ($Al_2O_3$) or titania ($TiO_2$) or a metal porous material such as stainless steel may be used. If necessary, the permselective membrane 3 may be disposed on a permeation side of the separation tube 2, not on a non-permeation side of the separation tube 2. Alternatively, both sides of the separation tube 2 may be coated with the membrane. It is to be noted that a shape of the separation tube is not limited to a tubular shape, and a flat-plate shape may be used. There is not any special restriction on the shape as long as a gas as a separation target is separated to the non-permeation side and the permeation side.

In the permselective membrane type reactor 100 of the present embodiment shown in FIGS. 1A and 1B, it is preferable that a noble metal contained in the catalyst layer 4 (the first catalyst layer 4a) is at least one selected from the group consisting of Ru, Rh, Pd, Ag, Ir, Pt, and Au. Among these metals, Pt is especially preferable. By using such a noble metal, the water-gas shift reaction represented by the above formula (a) can efficiently proceed to obtain hydrogen.

The first catalyst layer 4a is preferably constituted that the noble metal is dispersed on a support made of a porous inorganic oxide. Examples of the porous inorganic oxide include an oxide containing at least one selected from the group consisting of Ti, Al, Zr, Ce, Si, and Mg. In other words, the examples of the porous inorganic compound include $TiO_2$, $Al_2O_3$, $ZrO_2$, $CeO_2$, $SiO_2$ and, MgO. Alternatively, SiC may be used. Among them, $TiO_2$ and $ZrO_2$ are especially preferable. A content ratio of a substance such as Ti with respect to the whole porous inorganic oxide is preferably 30 mass % or more, and further preferably 50 mass % or more. A catalyst shape is preferably such a shape that the catalyst has a large surface area, and a pellet, foam, or honeycomb catalyst may be used. A thickness of the noble metal-based catalyst layer to be disposed is 0.1 to 5 cm, preferably 0.15 to 3 cm, and more preferably 0.2 to 1 cm.

Moreover, in the catalyst layer 4 (the second catalyst layer 4b), an iron-based catalyst such as an iron-chromium catalyst may be used. The iron-chromium catalyst has been used for a long time as a catalyst for a high temperature water-gas shift reaction in an ammonia synthesis plant or the like. The catalyst is usually used at a temperature of 300° C. or more.

With regard to a volume ratio of packing amount between the noble metal-based catalyst and a non-noble metal-based catalyst (the iron-based catalyst), the former has a ratio of 1, and the latter has a ratio of 0.5 to 40, preferably 0.7 to 30, and further preferably 1 to 20.

When the water-gas shift reaction is performed using the permselective membrane type reactor 100 of the present embodiment shown in FIGS. 1A and 1B, first, a reforming gas containing carbon monoxide obtained by reacting methane with water vapor, carbon dioxide, water, hydrogen, non-reacted methane, and the like is introduced into the reaction tube 1 from the inlet 11. Then, carbon monoxide and water in the reforming gas are subjected to a water-gas shift reaction via the catalyst 4 to obtain hydrogen and carbon dioxide. Hydrogen obtained by a reforming reaction and hydrogen obtained by the water-gas shift reaction selectively permeate the permselective membrane 3 to flow into the permeation side, and is discharged to the outside (recovered). Furthermore, hydrogen which has not flowed into the separation tube 2 and other components are discharged from the reaction tube 1 via the outlet 12.

A reaction temperature at a time when the water-gas shift reaction is performed is preferably 150 to 600° C., further preferably 175 to 575° C., and especially preferably 300 to 500° C. When the reaction temperature is lower than 150° C., deterioration of the membrane due to hydrogen embrittlement and deficiency of catalyst activity are concerned. On the other hand, when the reaction temperature is higher than 600° C., in addition to the deterioration of the membrane, increase of the methanation due to decrease of selectivity of the catalyst is concerned. When the permselective membrane type reactor of the present embodiment is used, a hydrogen refinement process heretofore constituted of multiple stages can be replaced with a one-stage process. Therefore, the present embodiment is advantageous from viewpoints of energy efficiency and device compactness as compared with a conventional process.

With regard to a flow rate of the material gas at a time when the water-gas shift reaction is performed, an optimum flow rate can appropriately be selected in accordance with sizes of the reactor and the separation tube, the thickness and area of the permselective membrane, and the like.

EXAMPLES

The present invention will hereinafter be described in detail in accordance with examples, however the present invention is not limited to these examples.

Figure 3:
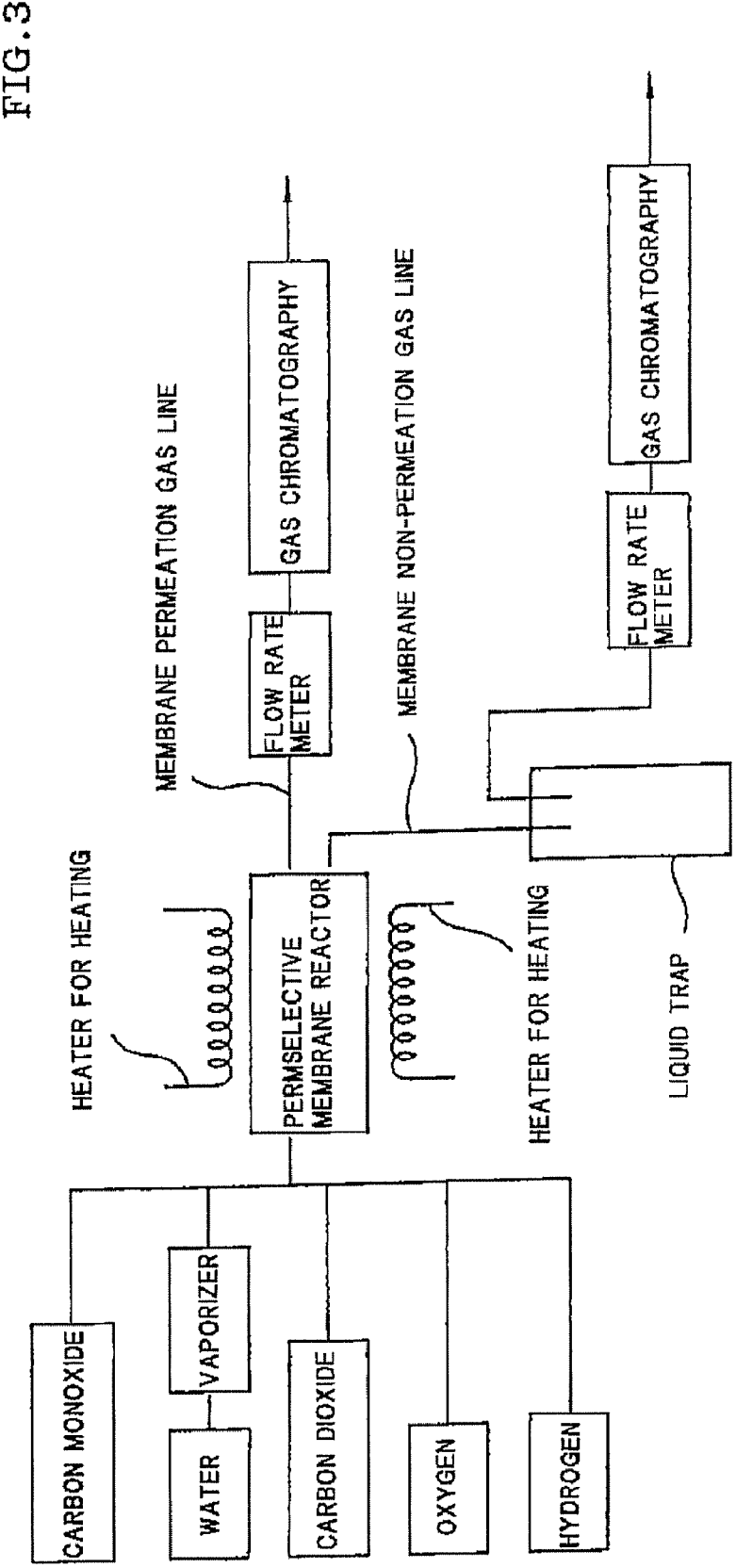
FIG. 3 is a schematic view showing a constitution of a test device used in examples.

<Device> permselective membrane type reactors of Example 1 and Comparative Example 1 were evaluated using a device shown in FIG. 3. Each reactor is connected to lines so that carbon monoxide, carbon dioxide, hydrogen, oxygen, and water can be used as material gas sources, whereby they can be selected, mixed, and supplied to the permselective membrane type reactors as necessary. Water is vaporized by a vaporizer, and then supplied to the respective reactors.

Downstream sides of a membrane permeation side gas line and a membrane non-permeation side gas line are connected to a membrane permeation side (an inside of a separation tube) and a membrane non-permeation side (an outlet of the reaction tube) of the permselective membrane type reactor, respectively. The downstream portion of the membrane permeation side gas line is connected to a flowmeter for measuring a gas amount and a gas chromatography for quantifying gas components. The downstream portion of the membrane non-permeation side gas line is similarly connected to a flowmeter and a gas chromatography. Furthermore, an upstream side of the flow rate meter is provided with a trap for capturing liquid components such as water, the trap being set to about 5° C. Heaters for heating are installed around the permselective membrane type reactor so that the outside of the reactor can be heated.

<Reaction>

As a material gas, a simulated reforming gas ($H_2$:CO:$CO_2$:$H_2O$=56:11:6:27) was supplied to the permselective membrane type reactor. A water-gas shift reaction as a reaction between carbon monoxide and water was performed to selectively separate hydrogen from a reaction product. A reaction temperature was adjusted to 400° C., a reaction side pressure was set to 3 atm, and a permeation side pressure was set to 0.1 atm. Gas flow rates and gas compositions on the membrane permeation side and the membrane non-permeation side were checked to calculate a hydrogen purity, a $CO_2$ conversion ratio, and a $CH_4$ conversion ratio. The $CO_2$ and $CH_4$ conversion ratios are represented by the following equations. The $CO_2$ conversion ratio is an index indicating a proceeding degree of a water-gas shift reaction (CO+$H_2O$=$CO_2$+$H_2$), and the $CH_4$ conversion ratio is an index indicating a proceeding degree of a methanation (CO+$3H_2$=$CH_4$+$H_2O$).

$CO_2$ conversion ratio[%]=100×(inlet CO flow rate-outlet CO flow rate-outlet $CH_4$ flow rate)/inlet CO flow rate)

$CH_4$ conversion ratio[%]=100×(outlet $CH_4$ flow rate)/(inlet CO flow rate)

A test result concerning durability is shown in Table 1, and a test result concerning a reaction is shown in Table 2.

TABLE 1

|  |  | Example 1 | Example 2 | Example 3 | Example 4 | Example 5 | Example 6 | Example 7 |
|---|---|---|---|---|---|---|---|---|
| First catalyst layer | | Platinum titania | Platinum titania | Platinum titania | Platinum titania | Platinum alumina | Platinum zirconia | Gold titania |
| Second catalyst layer | | Iron chromium | Iron chromium | Iron chromium | Iron chromium | Iron chromium | Iron chromium | Iron chromium |
| Membrane thickness of permselective membrane | | 20 μm | 2.5 μm | 0.5 μm | 0.05 μm | 2.5 μm | 2.5 μm | 2.5 μm |
| Thickness of first catalyst layer | | 0.5 cm | 0.5 cm | 0.5 cm | 0.5 cm | 0.5 cm | 0.5 cm | 0.5 cm |
| Catalyst packing amount ratio | | 3.8 | 3.8 | 3.8 | 3.8 | 3.8 | 3.8 | 3.8 |
| $H_2$ purity | After 30 min. | >99.99% | 99.95% | 99.32% | 98.60% | 99.93% | 99.91% | 99.93% |
| | After 1000 h | >99.99% | 99.91% | 99.29% | 98.36% | 99.92% | 99.90% | 99.90% |
| $CO_2$ conversion ratio | After 30 min. | 84% | 92% | 95% | 96% | 91% | 92% | 91% |
| | After 1000 h | 84% | 92% | 94% | 94% | 91% | 91% | 90% |

|  |  | Example 8 | Example 9 | Comparative Example 1 | Comparative Example 2 | Comparative Example 3 | Comparative Example 4 | Comparative Example 5 |
|---|---|---|---|---|---|---|---|---|
| First catalyst layer | | Platinum titania | Platinum titania | | | | Platinum titania | Platinum titania |
| Second catalyst layer | | Iron chromium | Iron chromium | Iron chromium | Iron chromium | Iron chromium | Iron chromium | Iron chromium |
| Membrane thickness of permselective membrane | | 2.5 μm | 2.5 μm | 20 μm | 2.5 μm | 0.5 μm | 2.5 μm | 2.5 μm |
| Thickness of first catalyst layer | | 0.3 cm | 1 cm | (0.5 cm) | (0.5 cm) | (0.5 cm) | 7 cm | 0.05 cm |
| Catalyst packing amount ratio | | 7.4 | 1.1 | 3.8 | 3.8 | 3.8 | 0.4 | 55 |
| $H_2$ purity | After 30 min. | 99.91% | 99.91% | >99.99 | 99.96% | 99.36% | 99.95% | 99.95% |
| | After 1000 h | 99.90% | 99.90% | 95.35 | 76.50 (broken) | 76.80 (broken) | 99.95% | 76.82 (broken) |
| $CO_2$ conversion ratio | After 30 min. | 92% | 89% | 83% | 91% | 95% | 79% | 95% |
| | After 1000 h | 90% | 89% | 78% | 70% | 69% | 79% | 69% |

Note:
The figure in the parentheses in Comparative Examples means the thickness of the second catalyst layer.

TABLE 2

|  | Example 10 | Example 11 | Comparative Example 6 | Comparative Example 7 |
|---|---|---|---|---|
| First catalyst layer | Platinum alumina | Platinum titania | Platinum alumina | Platinum titania |
| Second catalyst layer | Iron chromium | Iron chromium | | |
| Membrane thickness of permselective membrane | 2.5 μm | 2.5 μm | 2.5 μm | 2.5 μm |
| Thickness of first catalyst layer | 0.5 cm | 0.5 cm | 0.5 cm | 0.5 cm |
| $CO_2$ conversion ratio | 88.2% | 90.4% | 84.8% | 88.5% |
| $CH_4$ conversion ratio | 0.08% | 0.03% | 3.80% | 1.52% |

Example 1

There was used a separation tube including a bottomed cylindrical alumina porous material (an outer diameter of 10 mm, a length of 75 mm) and a 75% Pd-25% Ag alloy membrane formed on the surface thereof, as a permselective membrane. The membrane to which hydrogen selectively permeated was formed in a thickness of 20 μm by plating. As catalysts, platinum titania in which Pt was carried on outer surfaces of 1 mmΦ titania pellets by a dip method, and an iron-chromium catalyst (a size of about 3 mm) having a pellet shape were used. Platinum titania (a first catalyst layer) was introduced around the separation tube, and an iron-chromium catalyst (a second catalyst layer) was introduced around an outer periphery of the first catalyst layer. Arrangement of the respective catalyst layers was controlled to be in the form of a packed bed as shown in FIGS. 1A, 1B, and 2.

Examples 2 to 11

Also in Examples 2 to 11, in the same manner as in Example 1, membrane thicknesses, catalyst types, and catalyst layer thicknesses shown in Tables 1 and 2 were used. Specifically, a noble metal of a first catalyst layer was changed in Examples 5 to 7, and a thickness of a first catalyst layer was changed in Examples 8 and 9. It is to be noted that the thickness of the first catalyst layer in the tables corresponds to r in FIG. 2.

Comparative Example 1

There was used a separation tube including a bottomed cylindrical alumina porous material (an outer diameter of 10 mm, a length of 75 mm) and a 75% Pd-25% Ag alloy membrane formed on the surface thereof, as a permselective membrane. The membrane to which hydrogen selectively permeated was formed in a thickness of 20 μm by plating. As a catalyst, only an iron-chromium catalyst (a size of about 3 mm) having a pellet shape was used. A gap between the reaction tube and the separation tube was packed with the catalyst in the form of a packed bed as shown in FIGS. 1A and 1B.

Comparative Examples 2 to 7

Comparative Examples 2 and 3 were similar to Comparative Example 1 except membrane thicknesses. A thick first catalyst layer was used in Comparative Example 4, and a thin first catalyst layer was used in Comparative Example 5. A catalyst layer of a noble metal-based catalyst only was used in Comparative Examples 6 and 7.

<Result>

(Test Result Concerning Durability)

In the permselective membrane type reactors, a continuous operation was performed for 1000 h on various conditions. Comparison of hydrogen purities of 30 minutes and 1000 h after start of a reaction is shown in Table 1. It is to be noted that a catalyst packing amount ratio (a volume ratio) in the tables is a volume ratio of a non-noble metal-based catalyst (an iron-based catalyst) with respect to a noble metal-based catalyst of 1. It is seen from Table 1 that there is no decrease of the hydrogen purity after elapsed time in any of Examples 1 to 9. On the other hand, in Comparative Examples 1 to 3, and 5, the hydrogen purity largely decreased with the elapse of time. After the reaction, a Pd membrane was taken to observe the surface of the Pd membrane with an SEM. In the Pd membranes of Comparative Examples 1 to 3, and 5, a reaction between the Pd membrane and iron as a catalyst component, and deterioration of the Pd membrane due to the reaction were confirmed. In Comparative Example 4, the deterioration of the Pd membrane was suppressed, however a $CO_2$ conversion ratio lowered both in an initial stage of the reaction and after 1000 h. On the other hand, in Examples 1 to 9, a deteriorated portion on the surface of a Pd membrane due to a reaction between the Pd membrane and a catalyst component was not confirmed, and a high $CO_2$ conversion ratio was obtained both in an initial stage of the reaction and after 1000 h.

(Test Result Concerning Reaction)

Comparison of a result in a case where only a noble metal-based catalyst is used in the permselective membrane type reactor and a result in a case where a noble metal-based catalyst and an iron-based catalyst were used in the reactor is shown in Table 2. A $CO_2$ conversion and a $CH_4$ conversion in Table 2 indicate values in an initial stage of a reaction. In Comparative Examples 6 and 7 in which only the noble metal-based catalyst was used, $CH_4$ was formed by a methanation. On the other hand, it has been seen that in Examples 10 and 11 in which the noble metal-based catalyst and the iron-based catalyst were used, the formation of $CH_4$ could be suppressed as compared with the result of the comparative example in which only the noble metal-based catalyst was used. It has been seen from the present test result that the water-gas shift reaction can more selectively be performed by use of the noble metal-based catalyst and the iron-based catalyst in the membrane type reactor.

As described above, it is constituted that a catalyst layer has a noble metal-based catalyst in a first catalyst layer on the side of a permselective membrane side, and an iron-based catalyst in a second catalyst layer away from the permselective membrane as compared with the first catalyst layer, whereby a water-gas shift reaction can efficiently proceed to obtain hydrogen without deteriorating the permselective membrane. Moreover, the inexpensive iron-based catalyst is used, whereby cost can be reduced, and the reactor can be made compact.

A reactor of the present invention can be installed in a stage subsequent to a reforming reaction in a hydrogen producing process, whereby efficiently recovers hydrogen.

What is claimed is:

1. A permselective membrane reactor comprising:
    a cylindrical reactor body having a gas inlet on one end thereof and a retentate gas outlet as a gas outlet thereof at an end thereof opposite to the gas inlet;
    a separation tube inserted into the center portion of the cylindrical reactor body, wherein the separation tube has an open end as a permeate gas outlet positioned adjacent to the gas outlet of the reactor body, and an opposed round bottom portion positioned adjacent to the gas inlet of the reactor body, and wherein the separation tube has a permselective membrane formed of a Pd membrane or a Pd alloy membrane formed on at least an outer surface thereof;
    a first catalyst layer disposed in direct contact with the outer surface of the permselective membrane; and
    a second catalyst layer disposed in direct contact with the first catalyst layer and away from the permselective membrane as compared with the first catalyst layer,
    wherein the first catalyst layer is a noble metal-based catalyst and the second catalyst layer is an iron-based catalyst.

2. The permselective membrane reactor according to claim 1, wherein the first catalyst layer has a thickness of 0.1 to 5 cm.

3. The permselective membrane reactor according to claim 1, wherein the noble metal-based catalyst of the first catalyst layer is packed in a range of 1:0.5-40 in a volume ratio, with relation to a packed amount of the iron-based catalyst of the second catalyst layer.

4. The permselective membrane reactor according to claim 1, wherein the noble metal contained in the first catalyst layer is at least one selected from the group consisting of Ru, Rh, Pd, Ag, Ir, Pt, and Au.

5. The permselective membrane reactor according to claim 4, wherein the first catalyst layer is a layer carrying the noble metal, which is carried on a carrier constituted of a porous inorganic oxide including at least one selected from the group consisting of Ti, Al, Zr, Ce, Si, and Mg.

6. The permselective membrane reactor according to claim 1, wherein the iron-based catalyst is an iron chromium catalyst.

7. The permselective membrane reactor according to claim 3, wherein the iron-based catalyst is an iron chromium catalyst.

8. The permselective membrane reactor according to claim 1, wherein the Pd alloy forming the permselective membrane is a Pd—Ag alloy or a Pd—Cu alloy.

9. The permselective membrane reactor according to claim 1, wherein the permselective membrane has a membrane thickness of 20 μm or less.

10. The permselective membrane reactor according to claim 1, wherein at least one of the first and second catalyst layers contains a catalyst dispersed on a substrate formed in a pellet, foam, or honeycomb shape, or a catalyst itself formed in a pellet, foam, or honeycomb shape.

\* \* \* \* \*